(12) United States Patent
Kim et al.

(10) Patent No.: US 6,855,458 B1
(45) Date of Patent: Feb. 15, 2005

(54) NON-AQUEOUS ELECTROLYTE COMPOSITION FOR BATTERIES

(75) Inventors: Jong Seob Kim, Taejon-Shi (KR); Young Gyu Kim, Taejon-Shi (KR); Tu Won Chang, Taejon-Shi (KR); Kwang Sik Kim, Chunan-Shi (KR); Jin Sung Kim, Seoul (KR); Ky Hoon Ahn, Seoul (KR)

(73) Assignees: Cheil Industries, Inc. (KR); Samsung SDI Co., Ltd. (KR)

( * ) Notice: Subject to any disclaimer, the term of this patent is extended or adjusted under 35 U.S.C. 154(b) by 0 days.

(21) Appl. No.: 09/786,012

(22) PCT Filed: Dec. 24, 1999

(86) PCT No.: PCT/KR99/00811

§ 371 (c)(1),
(2), (4) Date: Feb. 28, 2001

(87) PCT Pub. No.: WO01/03229

PCT Pub. Date: Jan. 11, 2001

(30) Foreign Application Priority Data

Jul. 1, 1999 (KR) .............................. 99-26358

(51) Int. Cl.[7] .............................. H01M 6/04; H01M 6/16
(52) U.S. Cl. ........................ 429/199; 429/330; 429/332
(58) Field of Search ................................ 429/324, 329, 429/330, 332, 199

(56) References Cited

U.S. PATENT DOCUMENTS 5,192,629 A    3/1993   Guyomard et al.

FOREIGN PATENT DOCUMENTS

| JP | 5074485 | | 3/1993 | |
| JP | 8064240 | | 8/1996 | |
| JP | 10-112335 | * | 4/1998 | .......... H01M/10/40 |
| JP | 11-329490 | * | 11/1999 | .......... H01M/10/40 |

OTHER PUBLICATIONS

The Merck Chemical Database. Available at: http://www.chemdat.de/cdrl/catalog/standard/en/index.html.*

* cited by examiner

*Primary Examiner*—Patrick Ryan
*Assistant Examiner*—Julian Mercado
(74) *Attorney, Agent, or Firm*—Saliwanchik, Lloyd & Saliwanchik

(57) ABSTRACT

Disclosed is a non-aqueous electrolyte composition for batteries, which is composed of a mixture of a fluorobenzene component and a carbonic acid ester component in which the volume ratio of the fluorobenzene component to the carbonic acid ester component ranges from 50:50 to 5:95. The non-aqueous electrolyte composition has a significant advantage over electrolyte compositions employing carbonic acid ester solvents only, in terms of low temperature performance, cell life, and high-temperature dischargeability.

5 Claims, No Drawings

NON-AQUEOUS ELECTROLYTE COMPOSITION FOR BATTERIES

TECHNICAL FIELD

The present invention relates, in general, to non-aqueous electrolyte compositions for secondary lithium cells and, more particularly, to non-aqueous electrolyte compositions which allow the cells to be greatly improved in low temperature performance, cell life, and high-temperature dischargeability.

PRIOR ART

Small, slim lithium ion batteries, which are prevalent for use in laptop computers, palmtop computers, camcorders, cellular phones, etc., usually adopt lithium metal-mixed oxides for active cathode materials, carbonaceous materials or metal lithium for active anode materials, and solutions of lithium salts in organic solvents for electrolytes. Conventionally, the organic solvents used for the electrolytes for secondary lithium cells are mixtures of at least two species selected from ethylene carbonate (EC), propylene carbonate (PC), dimethyl carbonate (DMC), diethyl carbonate (DEC), dipropyl carbonate (DPC), ethylmethyl carbonate (EMC), methylpropyl carbonate (MPC), ethylpropyl carbonate (EPC), etc. while a representative example of the lithium salts used is $LiPF_6$.

In recent, the improvement in performance of lithium secondary cells has usually been achieved by selecting appropriate combinations of carbonic acid ester-based solvents, by controlling composition ratios between the solvents used, and/or by recruiting certain additives. In addition, active research has been directed to the development of novel solvents, besides carbonic acid ester-based solvents, in order to improve the properties of electrolytes. For instance, Japanese Pat. Laid-Open Publication No. Heisei 8-287950 discloses a method of improving low temperature performance of cells by use of a solvent in which a fluorine-substituted cyclic carbonate compound and a carbonate compound are mixed at a volume ratio of 30:70. Japanese Pat. Laid-Open Publication No. Heisei 8-96850 introduces as a solvent a mixture of 20–60% of vinylene carbonate and a linear carbonate compound so as to improve the cycle life and energy density of a cell. The cycle life of a cell is also extended by use of a solvent comprising butylene carbonate and linear carbonate, according to the disclosure of Japanese Laid-Open Publication No. Heisei 7-326358. U.S. Pat. No. 5,192,629 discloses that, even upon over-charging to the extent of 4.5 V or more, a solvent, in which dimethyl carbonate and ethylene carbonate are mixed at a ratio ranging from 95/5 to 20/80 weight %, is useful to inhibit the electrolyte decomposition owing to oxidation, thereby extending the cycle life of the cell.

Because great differences in cell performance occur depending on kinds of the solvents selected from carbonic acid ester compounds and the mixture ratios of solvents, it is quite difficult to select appropriate solvents and their ratios. Further, vinylene carbonate and butylene carbonate are expensive and thus, economically unfavorable. When certain compounds are used to enhance the performance of cells, they can ameliorate only some properties of cells and may deleteriously affect other properties. For example, an electrolyte composition consisting of dimethyl carbonate and ethylene carbonate gives a contribution to the prolongation of the cycle life of the cell, but deteriorates low temperature performance.

DISCLOSURE OF THE INVENTION

It is an object of the present invention to overcome the above problems encountered in prior arts and to provide a non-aqueous electrolyte for lithium secondary cells, which brings about an improvement in the low temperature performance, high temperature storage, initial capacitance, and cycle life properties of lithium secondary cells.

In accordance with the present invention, there is provided a non-aqueous electrolyte composition for lithium secondary cells, comprising a lithium salt dissolved in an organic solvent system composed of a fluorobenzene component (FB) and a carbonic acid ester component (CE), wherein the solvent components are present in a volume percent ratio range from 50 FB: 50 CE to 5 FB 95 CE, said fluorobenzene component being one or more compounds represented by the following general formula 1:

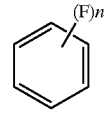

[Formula 1]

wherein F represents a fluorine element and n is an integer of 1–6; said carbonic acid ester component being one or more compounds represented by the following general formulas 2 and 3:

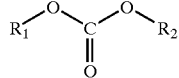

[Formula 2]

wherein $R_1$ and $R_2$, which may be the same or different, each represents an alkyl radical containing 1–4 carbon atoms.

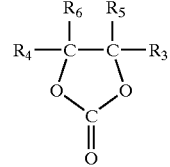

[Formula 3]

wherein $R_3$, $R_4$, $R_5$ and $R_6$, which may be the same or different, each represents a hydrogen atom or an alkyl radical containing 14 carbon atoms.

BEST MODES FOR CARRYING OUT THE INVENTION

The present invention pertains to a mixture of fluorobenzene and carbonic acid ester, useful for a non-aqueous electrolyte for lithium cells.

Examples of the fluorobenzene compound represented by the general formula 1 include fluorobenzene, difluorobenzene, trifluorobenzene, tetrafluorobenzene, pentafluorobenzene and hexafluorobenzene. These compounds may be used alone or in combination. This fluorobenzene solvent component appropriately coordinates lithium ions to effect high conductivity at low temperatures. In addition, the fluorobenzene solvent is 4.5 V or higher in linear sweep voltametry (LSV), showing resistance to the electrolyte decomposition reaction at a cathode upon charging. Consequently, the fluorobenzene solvent improves not only low temperature properties, but also life performance of cells.

In the present invention, carbonic acid ester which composes the organic solvent for the electrolyte, is a cyclic carbonate of the general formula 3, a chain carbonate of the general formula 2, or a mixture thereof. The cyclic carbonate of the general formula 3 is exemplified by ethylene carbonate, propylene carbonate, and butylene carbonate. As for the chain carbonate of the general formula 2, its examples include dimethyl carbonate, diethyl carbonate, dipropyl carbonate, methylpropyl carbonate, ethylmethyl carbonate, ethylpropyl carbonate, etc. The above-exemplified carbonate compounds may be used alone or in combination.

In the solvent mixture of fluorobenzene and carbonic acid ester, the fluorobenzene compound of the general formula 1 preferably amounts 5 to 50% by volume while the carbonic acid ester of the general formula 2 and/or 3 ranges from 50 to 95% by volume, correspondingly. For example, when the fluorobenzene compound of the general formula 1 is over 50% by volume, phase separation of the solvent components used occurs, along with the solidification of the lithium salt, at low temperatures, deteriorating the low temperature performance and the life properties of the cells. On the other hand, if the fluorobenzene compound is used at an amount of less than 5% by volume, almost no addition effects are obtained on cell performance. Under this condition, the preferable volume ratio of the compound of the general formula 1 to the compound of the general formula 2 is in a range of 2:1–1:10. This volume range is also true of the ratio of the compound of the general formula 1 to the compound of the general formula 3.

Useful as the lithium salt are one or more compounds selected from $LiPF_6$, $LiClO_4$, $LiCF_3SO_3$, $LiAsF_6$, and $LiBF_4$. The salt ranges, in concentration, from 0.7 to 2.0 M. For example, when the salt has a concentration of less than 0.7 M, the electrolyte is too low in electroconductivity to function well. On the other hand, if the concentration of the electrolyte exceeds 2.0 M, an increase is brought about in the viscosity at low temperatures, giving rise to a decrease in the mobility of lithium ions and thus, in the low temperature performance of the cell.

A better understanding of the present invention may be obtained in light of the following examples which are set forth to illustrate, but are not to be construed to limit the present invention.

EXAMPLES 1 THROUGH 5

In these examples, one compound was selected from each of the solvent groups respectively represented by the general formulas 1 to 3 and the selected solvent compounds were mixed at different ratios within the effective range of the invention.

In Example 1, ethylene carbonate (EC), dimethyl carbonate (DMC) and fluorobenzene (FB) were mixed at a volume ratio of 1: 1: 1 while $LiPF_6$ was dissolved as a solute. The electrolyte thus obtained was used to prepared a 18650 cylindrical cell, after which an examination was made of the discharge/charge capacity ratio (%) after a first charge/discharge cycle, the discharge/nominal capacity ratio (%) at −20° C., and the discharge/nominal capacity ratio (%) after 150 cycles to evaluate the life performance of the cell. The results are given in Table 1, below. In the cell, carbon black was used as an active material for the anode, polyvinylidene-fluoride (PVDF) as a binder, $LiCoO_2$ as an active material for the cathode, and acetylene black as a current collector.

In Examples 2 through 5, the same procedure as in Example 1 was repeated except that the volume ratios of the solvent components were used according to the instruction of Table 1, below. The properties of the cells thus prepared were measured and are given in Table 1.

COMPARATIVE EXAMPLE 1

A cell was prepared in a similar manner to that of Example 1, except that a mixture of 1:1 ethylene carbonate (EC):dimethyl carbonate (DMC) was used as a solvent for the electrolyte. The evaluation of the properties of the cell is shown in Table 1, below.

TABLE 1

| Nos. of Exmpl. | Vol. Ratio of Solvents | % Discharge/ Charge Capacity after 1st cycle | % Discharge/ Nominal Capacity at −20° C. | % Discharge/ Nominal Capacity after 150 Cycles |
|---|---|---|---|---|
| 1 | EC:DMC: FB = 1:1:1 | 93.8 | 83.4 | 85.5 |
| 2 | EC:DMC: FB = 4:4:1 | 93.4 | 74.3 | 84.3 |
| 3 | EC:DMC: FB = 2:2:1 | 93.6 | 82.6 | 85.2 |
| 4 | EC:DMC: FB = 2:1:2 | 93.9 | 75.5 | 83.0 |
| 5 | EC:DMC: FB = 1:1:2 | 94.1 | 60.8 | 81.3 |
| C. 1 | EC:DMC = 1:1 | 93.4 | 23.7 | 84.3 |

Note:
EC = ethylene carbonate, DMC = dimethyl carbonate
FB = fluorobenzene

EXAMPLES 6 THROUGH 10

In these examples, mixtures of the compounds selected from the general formulas 1 to 3, were used as solvents for the electrolyte with the solvent component of the general formula 1 being changed according to examples.

In Example 6, a mixture of 3:3:1:1 ethylene carbonate (EC): diemthyl carbonate (DMC): diethyl carbonate (DEC): fluorobenzene (FB) was used as a solvent to prepare a cell. An examination was made of the discharge/charge capacity ratio (%) after storage at a high temperature (60° C.), the discharge/nominal capacity ratio (%) at −20 C. and the discharge/nominal capacity ratio (%) after 300 cycles to evaluate the life performance of the cell. The results are given in Table 2, below.

In Examples 7 through 10, the same procedure as in Example 6 was repeated except that the solvent components were used according to the instruction of Table 2, below. The cells thus prepared were measured for the above properties and the results are given in Table 2.

COMPARATIVE EXAMPLES 2 AND 3

Cells were prepared in a similar manner to that of Example 1, except that solvents were used as indicated in Table 2, below. The evaluation of the properties of the cells was conducted as in Example 6 and the results are shown in Table 2, below.

TABLE 2

| Nos. of Exmpl. | Vol. Ratio of Solvents | % Dischargeability after Storage at High Temp. | % Discharge/ Nominal Capacity at −20° C. | % Discharge/ Nominal Capacity after 300 Cycles |
|---|---|---|---|---|
| 6 | EC:DMC:DEC: FB = 3:3:1:1 | 89.2 | 84.5 | 84.2 |
| 7 | EC:DMC:DEC: 1,2-DFB = 3:3:1:1 | 89.0 | 84.1 | 81.0 |
| 8 | EC:DMC:DEC: 1,3-DFB = 3:3:1:1 | 89.2 | 83.5 | 78.5 |
| 9 | EC:DMC:DEC: 1,4DFB = 3:3:1:1 | 89.2 | 84.2 | 80.3 |
| 10 | EC:DMC:DEC: 1,2,4-TFB = 3:3:1:1 | 88.3 | 81.3 | 77.5 |
| C.2 | EC:DMC = 1:1 | 87.5 | 28.7 | 81.5 |
| C.3 | EC:DMC: DEC = 3:3:1 | 85.5 | 83.1 | 76.1 |

Note:
EC = ethylene carbonate, DMC = dimethyl carbonate
DEC = diethyl carbonate, FB = fluorobenzene
DFB = difluorobenzene, TFB = trifluorobenzene

EXAMPLES 11 THROUGH 15

In these examples, two compounds of the general formula 3, and one compound of each of the general formulas 1 and 2, were mixed at different ratios within the volume range of the present invention and evaluated for their influence on the properties of cells, especially standard capacity against nominal capacity. Ethylene carbonate (EC), dimethyl carbonate (DMC), propylene carbonate (PC), and fluorobenzene (FB) were mixed at volume ratios according to the instructions of Table 3, below to prepare cells. An examination was made of the standard capacity/nominal capacity ratio (%), the discharge/nominal capacity ratio (%) at −20° C., and the discharge/nominal capacity ratio (%) after 300 cycles to evaluate the life performance of the cell. The results are given in Table 3, below.

COMPARATIVE EXAMPLES 4 THROUGH 7

Cells were prepared in a similar manner to that of Example 1, except that solvents were used as indicated in Table 3, below. The evaluation of the properties of the cells was conducted as in Example 1 and the results are shown in Table 3, below.

TABLE 3

| Nos. of Exmpl. | Vol. Ratio of Solvents | % Standard/ Nominal Capacity | % Discharge/ Nominal Capacity at −20° C. | % Discharge/ Nominal Capacity after 300 Cycles |
|---|---|---|---|---|
| 11 | EC:DMC:PC: FB = 4:4:0.5:1.5 | 100.5 | 84.3 | 84.5 |
| 12 | EC:DMC:PC: FB = 4:3.5:1:1.5 | 99.6 | 80.9 | 85.5 |
| 13 | EC:DMC:PC: FB = 3.5:4:0.5:2 | 100.7 | 85 | 88.0 |
| 14 | EC:DMC:PC: FB = 3.5:3.5:1:2 | 100.1 | 82.2 | 87.8 |
| 15 | EC:DMC:PC: FB = 3:2.5:0.5:4 | 100.5 | 85.5 | 81 |
| C. 4 | EC:DMC: PC = 4.5:4.5:1 | 97.5 | 65.1 | 80.5 |
| C. 5 | EC:DMC: PC = 4,5:4.5:1 | 95.3 | 47.3 | 72.1 |
| C. 6 | EC:EMC: PC = 4.5:4.5:1 | 96.5 | 67.4 | 74.0 |
| C. 7 | EC:DMC:PC: TFT = 3:3:1:1 | 95.5 | 75.4 | 35 (after 200 cycles) |

Note:
EC = ethylene carbonate, DMC = dimethyl carbonate
PC = propylene carbonate, EMC = ethylmethyl carbonate
FB = fluorobenzene, TFT = ααα-fluorotoluene Assay for Physical Properties Low Temperature Dischargeability (% Discharge capacity/nominal capacity at −20 C.): when a cell was charged at 0.2 C to the potential of 4.1 V, allowed to stand at −20 C. for 16 hours, and discharged at 0.2 C to the potential of 2.75 V, the capacity decrease was measured.

Cycle Life (% Discharge capacity/nominal capacity after cycles): after 150–300 cycles, each cycle consisting of charging up to 4.1 V and discharging down to 2.75 V at 1 C, a cell was measured for the decrease of cell capacity.

High Temperature Storage Test (% Discharge capacity after storage at 60° C.): a cell was charged at 0.5 C to 4.1 V, allowed to stand at 60° C. for 30 days, and discharged at 0.2 C to 2.75 V, followed by measuring the decrease of cell capacity (discharge capacity/nominal capacity).

Standard Capacity: cell capacity shown when a cell was discharged at 1 C to 2.75 V after being charged at 0.5 C to 4.1 V.

As described hereinbefore, the non-aqueous electrolyte composition of the present invention has a significant advantage over conventional electrolyte compositions employing carbonic acid ester solvents only, in terms of low temperature performance, cell life, and high-temperature dischargeability.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A non-aqueous electrolyte composition for lithium secondary cells, comprising a lithium salt dissolved in an organic solvent system composed of a fluorobenzene component (FB) and a carbonic acid ester component (CE), wherein the solvent components are present in a ratio from 50 FB:50 CE to 12.5 FB:87.5 CE, based on volume percent, said fluorobenzene component being one or more compounds represented by the following general formula 1:

[Formula 1]

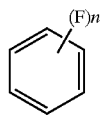

wherein F represents a fluorine element and n is an integer of 1–6; and said carbonic acid ester component having compounds represented by the following general formulas 2 and 3:

[Formula 2]

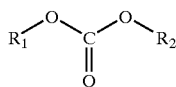

wherein $R_1$ and $R_2$, which may be the same or different, each represents an alkyl radical containing 1–4 carbon atoms and

[Formula 3]

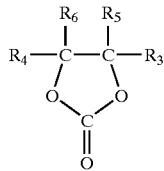

wherein $R_3$, $R_4$, $R_5$ and $R_6$, which may be the same or different, each represents a hydrogen atom or an alkyl radical containing 1–4 carbon atoms.

2. The non-aqueous electrolyte composition as set forth in claim 1, wherein said fluorobenzene component of the general formula 1 is a mixture of fluorobenzene and difluorobenzene.

3. The non-aqueous electrolyte composition as set forth in claim 1, wherein said lithium salt is selected from the group consisting of $LiPF_6$, $LiClO_4$, $LiAsF_6$, $LiBF_4$, $LiCF_3SO_3$ and mixtures thereof and used at a concentration of 0.7–2.0 M.

4. The non-aqueous electrolyte composition as set forth in claim 1, wherein said carbonic acid ester component comprises a compound selected from the group consisting of ethylene carbonate, propylene carbonate, butylene carbonate, dimethyl carbonate, diethyl carbonate, dipropyl carbonate, ethyhmethyl carbonate, methylpropyl carbonate, and ethylpropyl carbonate.

5. The non-aqueous electrolyte composition as set forth in claim 1, wherein said organic solvent system ranges, in the volume ratio of the solvent component of the general formula 1 to the solvent component of the general formula 2, from 2/1 to 1/4.

\* \* \* \* \*

UNITED STATES PATENT AND TRADEMARK OFFICE
CERTIFICATE OF CORRECTION

PATENT NO. : 6,855,458 B1
DATED : February 15, 2005
INVENTOR(S) : Jong Seob Kim

It is certified that error appears in the above-identified patent and that said Letters Patent is hereby corrected as shown below:

Column 2,
Line 13, "5FB95CE" should read -- 5FB: 95CE --.
Line 48, "14 carbon atoms" should read -- 1-4 carbon atoms --.

Column 5,
Line 37, "below to" should read -- below, to --.

Column 6,
Line 22, "Discbargeability" should read -- Dischargeability --.

Column 8,
Line 20, "ethyhmethyl" should read -- ethylmethyl --.

Signed and Sealed this

Twelfth Day of July, 2005

JON W. DUDAS
*Director of the United States Patent and Trademark Office*